(12) United States Patent
Huhn

(10) Patent No.: US 9,664,332 B2
(45) Date of Patent: May 30, 2017

(54) SHEET METAL BRACKET WITH REINFORCING CORE ROD

(71) Applicant: Ford Global Technologies, LLC, Dearborn, MI (US)

(72) Inventor: Henrik Martin Huhn, Nordrhein-Westfalen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/450,378

(22) Filed: Aug. 4, 2014

(65) Prior Publication Data
US 2015/0034786 A1    Feb. 5, 2015

(30) Foreign Application Priority Data
Aug. 5, 2013 (DE) .................. 10 2013 215 323

(51) Int. Cl.
*B62D 27/06*    (2006.01)
*F16M 13/02*    (2006.01)
(Continued)

(52) U.S. Cl.
CPC ............. *F16M 13/02* (2013.01); *B60N 2/015* (2013.01); *B62D 27/06* (2013.01); *B60N 2/01583* (2013.01); *B61D 45/001* (2013.01)

(58) Field of Classification Search
CPC .. B60N 2/01583; B60N 2/2887; B60N 2/289; B60N 2/2893; B60N 2/015;
(Continued)

(56) References Cited

U.S. PATENT DOCUMENTS

| | | | | |
|---|---|---|---|---|
| 2,583,257 A | * | 1/1952 | Dietrichson | ......... B61D 45/002 410/109 |
| 2,601,103 A | * | 6/1952 | Dietrichson | ......... B61D 45/001 410/113 |

(Continued)

FOREIGN PATENT DOCUMENTS

| | | |
|---|---|---|
| DE | 10054586 A1 | 6/2001 |
| EP | 0749864 A1 | 12/1996 |
| JP | 2007125954 A | 5/2007 |

OTHER PUBLICATIONS http://www.thefabricator.com/article/assembly/bonding-with-adhesives Bonding with Adhesives Jeff Chapman May 7, 2010.*

*Primary Examiner* — Ingrid M Weinhold
(74) *Attorney, Agent, or Firm* — Jason C. Rogers; Bejin Bieneman PLC

(57) ABSTRACT

The present disclosure relates to a securing element for securing objects, such as vehicle seats, or for clamping loads, such as luggage, to a bodywork component and a securing system having a securing element. In order to confer increased strength on the securing element and furthermore to be able to secure it to the bodywork component in an inexpensive manner with a connection of high strength being produced, it is proposed that it has a composition comprising a sheet metal component and an elongate reinforcement element, the reinforcement element being surrounded with respect to the longitudinal direction thereof at least in a region at least in a partially peripheral manner by the sheet metal component so as to be able to transmit force.

12 Claims, 7 Drawing Sheets

(51) Int. Cl.
*B60N 2/015* (2006.01)
*B61D 45/00* (2006.01)

(58) Field of Classification Search
CPC .... B60P 7/0807; B60P 7/0815; B61D 45/001; F16M 13/02; B62D 27/06
USPC ......... 248/300, 503, 503.1, 227.1, 301–304, 248/339, 500; 410/109, 112–114, 102; 224/275, 534; 297/253; 292/92
IPC .......................................... B60P 7/0807,7/0815
See application file for complete search history.

(56) References Cited

U.S. PATENT DOCUMENTS

| | | | | | |
|---|---|---|---|---|---|
| 2,610,587 | A * | 9/1952 | Pietzsch | ............... | B61D 45/001 29/428 |
| 4,062,297 | A * | 12/1977 | Snyder | ............... | B60P 7/0815 105/409 |
| 5,102,187 | A * | 4/1992 | Harasaki | ............ | B62D 25/2027 296/204 |
| 5,370,437 | A * | 12/1994 | Alberda | ................. | B60J 5/0437 296/146.6 |
| 5,404,690 | A * | 4/1995 | Hanf | .................... | B60J 5/0437 29/897.2 |
| 5,756,167 | A * | 5/1998 | Tamura | ............... | B21C 37/0803 228/146 |
| 5,785,376 | A * | 7/1998 | Nees | ..................... | B60J 5/0444 296/146.6 |
| 5,997,069 | A * | 12/1999 | Coffey | ............... | B60N 2/01591 296/65.01 |
| 6,082,811 | A * | 7/2000 | Yoshida | ................ | B21C 23/205 296/146.6 |
| 6,250,703 | B1 * | 6/2001 | Cisler | ................ | B60N 2/01583 296/65.03 |
| 6,298,935 | B1 * | 10/2001 | Steenackers | ........... | B60K 13/04 180/296 |
| 6,382,710 | B1 * | 5/2002 | Funk | ...................... | B60R 19/24 276/29 |
| 6,491,337 | B2 * | 12/2002 | Averdiek | ............... | B62D 25/20 296/203.01 |
| 6,643,931 | B2 * | 11/2003 | Nees | ................... | B21C 37/0803 29/414 |
| 7,600,807 | B2 * | 10/2009 | Bachmann | ............. | B62D 25/20 296/187.08 |
| 8,075,049 | B2 * | 12/2011 | Mendoza | ................ | B62D 25/20 296/187.12 |
| 8,857,891 | B2 * | 10/2014 | Jeon | ...................... | B60J 5/0455 296/146.6 |
| 2004/0080195 | A1 * | 4/2004 | Adams | ................ | B60N 2/2887 297/253 |
| 2007/0045034 | A1 * | 3/2007 | Kim | ...................... | B62D 25/20 180/379 |
| 2012/0163906 | A1 * | 6/2012 | Inoue | .................... | B60J 5/0429 403/265 |

* cited by examiner

SHEET METAL BRACKET WITH REINFORCING CORE ROD

CROSS-REFERENCE TO RELATED APPLICATIONS

This application claims priority to German Patent Application No. DE 102013215323.6, filed on Aug. 5, 2013, the entire contents of which are incorporated herein in their entirety for all purposes.

INTRODUCTION

The present disclosure relates to a securing element for securing objects, such as vehicle seats, or for clamping loads, such as luggage, to a bodywork component. The present disclosure further relates to a securing system having the securing element.

Accordingly, disclosed herein is a composition that comprises a sheet metal component and an elongate reinforcement element, wherein the reinforcement element is surrounded with respect to the longitudinal direction thereof in a region at least in a partially peripheral manner by the sheet metal component so as to be able to transmit force. The reinforcement element may extend in the securing element at least over the region. It may extend up to an extent over the full length of the securing element or beyond.

Consequently, the sheet metal component and reinforcement element are connected to each other in a positive-locking and/or non-positive-locking manner. The sheet metal component can consequently have a reinforcement structure with the elongate reinforcement element. The reinforcement element may be integrated in the sheet metal component.

The elongate reinforcement element may consequently form a core of the securing element which is surrounded by the sheet metal component at least in a region at least in a partially peripheral manner so as to be able to transmit force. In a structurally advantageous manner, the elongate reinforcement element may be constructed as a round rod.

Advantageously, the securing element disclosed herein has an increased level of strength and can be secured to a bodywork component in an inexpensive manner with a connection of high strength being produced.

BACKGROUND

In bodywork construction, such securing elements are secured to the bodywork, for example, in order to secure seats, to secure folding backrests or to clamp loads, such as luggage. They must have a corresponding high level of strength, further be able to be produced in an inexpensive manner and be able to be secured to the bodywork in a simple manner, without weakening the strength thereof to a great extent.

Conventionally, a reinforcement element is formed either from a sheet metal component and spot-welded or screwed to the associated bodywork component, or from an elongate reinforcement element and in this instance often from a round rod which is connected to the bodywork, generally by means of shielded arc welding or soldering.

In principle, there are different structural types. In a first structural type, the round rod is secured in a manner positioned on the bodywork, often welded or screwed to a carrier. This is disclosed, for example, in DE 100 54 586 A1 using the example of a securing element for a vehicle seat, the round rod being constructed as a curved member. In a second structural type, the round rod is guided through an opening on the bodywork component and subsequently welded, optionally with additional reinforcement plates. An embodiment is disclosed in DE 100 54 586 A1, wherein the round rod is secured at the inner side in a transverse carrier and is accessible through openings which are provided. EP 0 749 864 B1 and JP 2007-125954 A each describe a fixing for a vehicle seat incorporated into a floor of the vehicle, the round rod being secured in each case at the end side in an opening. There are further solutions in which the round rod is connected to the bodywork by means of additional sheet metal flaps which engage over the round rod at both end sides.

Securing elements which exclusively comprise a formed sheet metal component may be considered to be advantageous with respect to the possible securing methods to the bodywork (spot welding, laser welding or screwing). However, securing elements which are formed from a sheet metal component are limited in terms of their possible strength by material and sheet metal thickness. Round rods, with respect to the component strength relative to the type of the load height and direction are generally higher, but are structurally more complex to secure to the bodywork component compared with a securing element formed from sheet metal.

SUMMARY

A securing element has a composition comprising a sheet metal component and an elongate reinforcement element, the reinforcement element being surrounded with respect to the longitudinal direction thereof at least in a region at least in a partially peripheral manner by the sheet metal component so as to be able to transmit force, the advantages of both structural types mentioned above are utilized and the disadvantages thereof avoided. On the one hand, the sheet metal construction of the securing element affords the possibility of producing planar connections to the bodywork which are advantageous for the introduction of force and load distribution and which are not possible with securing elements comprising only an elongate reinforcement element. With the reinforcement element as a strength-increasing core of the securing element, the component may achieve a high level of strength, which cannot be achieved with a securing element which is formed only from sheet metal.

Owing to the selection of the materials for the sheet metal component and the reinforcement element, the characteristic of the securing element can be influenced with respect to production ability, possibility of integration in the bodywork, strength and deformation behavior.

The reinforcement element may be produced from a high-strength material. The reinforcement element may be cut to length in a cost-effective manner from a preferably high-strength wire. In particular the use of high-strength material for the reinforcement element may be advantageous in this instance for receiving loads since the high strength results in less deformation under load. This in turn advantageously means a less powerfully varying load height and direction at the locations at which the securing element is secured to the bodywork.

Advantageously, the reinforcement element may be readily constructed as round solid material. The reinforcement element may also be constructed from a plurality of rods which are preferably of the same length and which can preferably be arranged parallel with each other and laterally adjacent to each other. To this end, the rods may have a round or polygonal, in particular a square or hexagonal, cross section profile. The rods may be connected to each other by means of a matrix, for example, of epoxy resin. This matrix may at the same time be an adhesive agent for laterally securing the reinforcement element to the sheet metal component which surrounds the reinforcement element.

The securing element can consequently be formed from a sheet metal blank into a tubular cross section in such a manner that, between provided securing locations to the bodywork, for example, a reinforcement element which is constructed as a wire piece is rolled with a core being formed. Owing to this structural type according to the present disclosure, the functional region of the securing element which is required to clamp or engage (for example, a seat base) is increased.

The sheet metal component may have, with respect to a longitudinal direction of the securing element, edge sides which extend in the region in the longitudinal direction and which are arranged at least in a portion or several portions of the region so as to be in abutment with each other in a blunt manner. Consequently, the sheet metal component in this portion or in these portions engages around the reinforcement element over the full periphery. Consequently, the sheet metal component may be constructed in a tubular manner at least in the portion or the portions. Preferably, the reinforcement element completely fills the inner space of the tubular portion or portions. The more completely the reinforcement element is surrounded over the periphery by the sheet metal component, the better the construction of the force path between the reinforcement element and the sheet metal component may be.

The edge sides may be connected to each other at least in the portion or at least in the portions. Consequently, an overall component strength of the securing element may be further increased. For example, in the event of loading and bending of the component, the risk of the tubular region of the sheet metal component bending open and even the wire piece and the sheet metal strip becoming separated from each other can be prevented. The edges may be materially integral with each other. To this end, they may be soldered or welded to each other. Advantageously, for minimal thermal loading of the sheet metal component, a welding operation using energy beams, such as laser or electron beams, may be carried out.

Advantageously, in order to produce a stronger bond between the reinforcement element and sheet metal member, the reinforcement element and the sheet metal component may be adhesively bonded to each other at the locations at which they are in mutual abutment or at least in the region. Consequently, in the event of loading and associated bending, the relative movement between the sheet metal component and reinforcement element can be further limited or prevented, which can otherwise lead to a partial or complete separation of the sheet metal component and reinforcement element. All of these measures for connecting the sheet metal component and reinforcement element enable an accordingly increased energy absorption of the securing element and consequently a correspondingly increased force absorption.

In a further advantageous embodiment of the securing element, the sheet metal component may have, for securing the securing element to the bodywork component, at both end sides, an end region in or on which connection elements and/or connection regions for securing the securing element to the bodywork component are provided. The securing of the securing element can be carried out in a known manner, for instance, by means of welding, hard soldering, screwing, riveting or adhesive bonding. The end regions may protrude beyond the reinforcement element or laterally cover it at least from one side. With the projection of the end regions, it is further possible to shield provided edges of the reinforcement element.

The sheet metal component may further be deformed in a portion which protrudes beyond the end region in such a manner that the end region is at least partially covered at the front side by the portion. To this end, the portion acting as a stop may be in abutment at the front side with the associated end region.

In a further developed embodiment of the securing element, the end regions may be constructed in the manner of flaps. The flap-like end regions may be constructed in each case so as to have one wing or several wings. In this instance, the contour of the flaps may be adapted in each case to the surface contour of the provided surface region of the bodywork component. A more secure fit of the securing element to the bodywork component can thus be achieved.

The end regions may each have at least one desired bending location for orientation of the end regions at a provided abutment region of the bodywork component. This facilitates mechanical and/or manual adaptation of the orientation of the flap to the provided surface region of the bodywork component. The desired bending location may be provided at the end side of the region of the sheet metal component or in a transition region from the region to the end regions.

Alternatively, a securing system having a securing element according to one of the embodiments described above and below may be provided.

In particular, an embodiment of the securing system may be provided in which the securing element has a composition comprising a sheet metal component and an elongate reinforcement element, wherein the reinforcement element is surrounded with respect to the longitudinal direction thereof at least in a region at least in a partially peripheral manner by the sheet metal component so as to be able to transmit a force, the sheet metal component protruding with an end region at both end sides beyond the reinforcement element in order to secure the securing element to the bodywork component. In this instance, the end regions may each have a securing portion which is orientated with respect to an abutment region of the bodywork component parallel with the surface of the abutment region, which abutment region is provided for securing the securing element.

The securing element is preferably secured to the bodywork component, in particular in the region of the flaps by means of spot welding.

BRIEF DESCRIPTION OF THE FIGURES

The present disclosure is explained in greater detail below with reference to a plurality of securing element embodiments which are illustrated in the drawings, in which.

DETAILED DESCRIPTION

Figure 6:
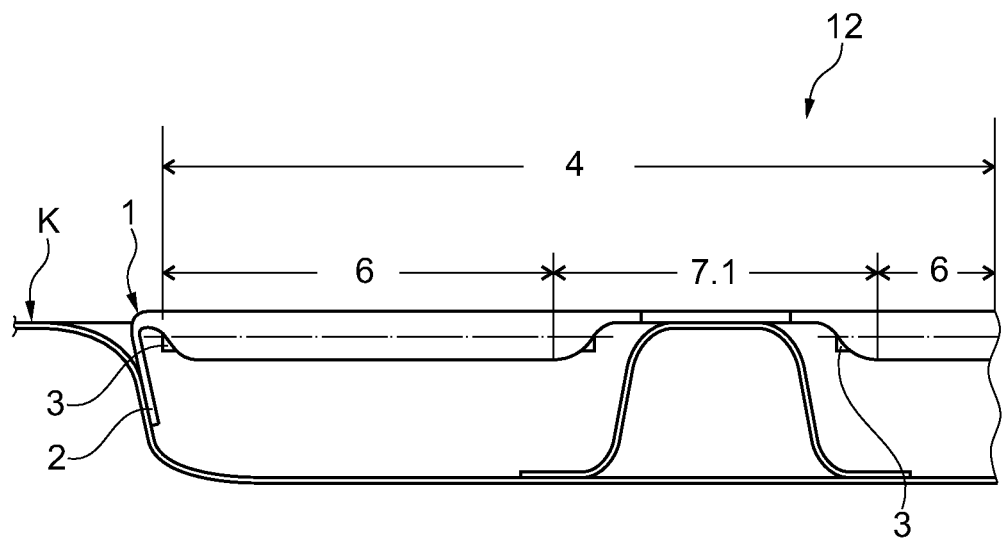
FIG. 6 is a side view of another embodiment of the securing system.

FIGS. 1 to 4 and 7 show as various views and embodiments a securing element 1 for securing to a bodywork component K, respectively, the securing element 1 having a composition comprising a sheet metal component 2 and an elongate reinforcement element 3. The reinforcement element 3, with respect to the longitudinal direction I thereof, with the exception of the reinforcement element 3 according to FIG. 6, is in this instance surrounded in a central region 4 over the complete periphery by the sheet metal component 2 so as to be able to transmit force. The sheet metal component 2 is in abutment with the reinforcement element 3 in a positive and non-positive-locking manner. FIGS. 8 and 10 each show further embodiments of the sheet metal component 2.

Figures 2A, 2B:
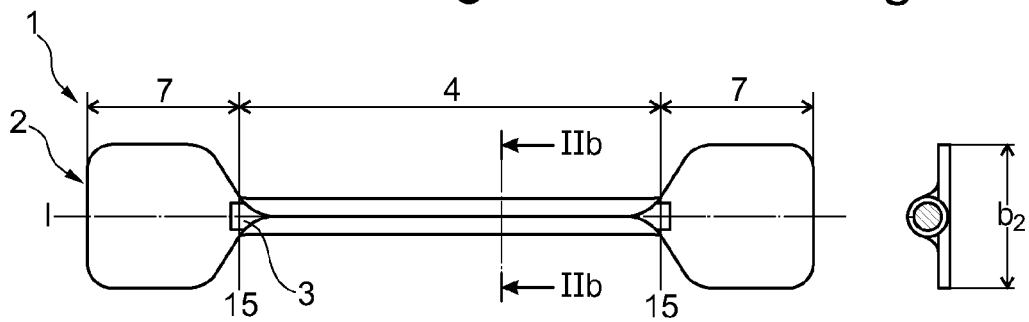
Figure 2C:
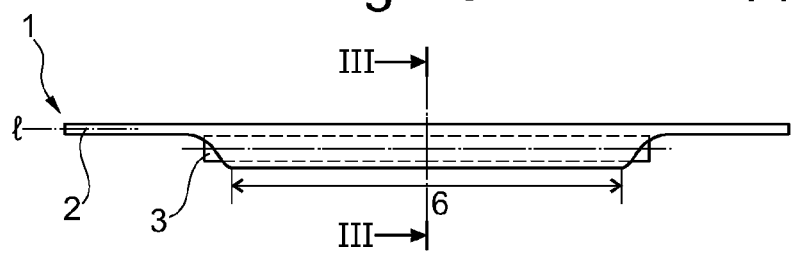
Figures 3A, 3B, 3C:
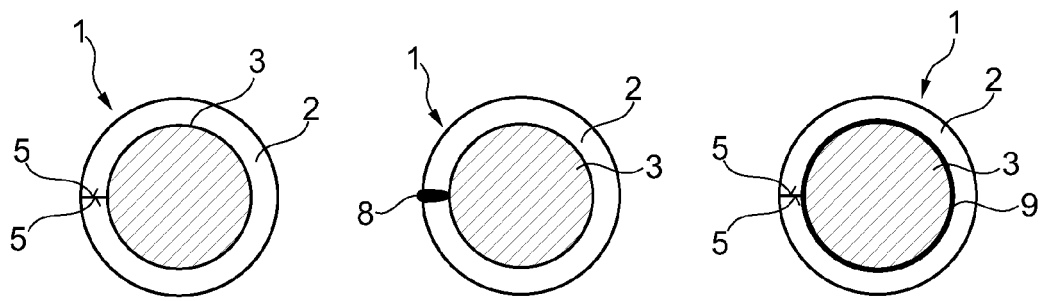
FIGS. 3a to 3c are a cross section of the securing element according to FIG. 2, but each with a construction variant, respectively.

As can be seen in particular in FIGS. 3a-3c, the sheet metal component 2 has edge sides 5 which extend in the region 4 in the longitudinal direction I. They are arranged at least in a portion 6 or a plurality of portions 6 (FIG. 6) of this region 4 so as to be in blunt abutment with each other. FIGS. 3 a-3 c are cross sections of the securing element 1 according to the cross section extent III-III in FIG. 2 c without an associated end region, respectively. In this instance, the edge sides 5 in FIGS. 3 a and 3 c are simply in blunt abutment with each other whilst they are connected to each other in a materially integral manner according to FIG. 3 b with a weld seam 8 being formed. In this instance, laser welding has been used as the method. According to FIG. 3 c, the reinforcement element 3 is adhesively bonded at the radially outer side to the sheet metal component 2, which is indicated in the Figure by an adhesive layer 9. Both measures, the adhesive bonding and the welding, may also be used together in a securing element. Both measures result in the strength, in particular torsion resistance with respect to the longitudinal axis and bending resistance with respect to an axis in the transverse direction of the securing element 1, being significantly increased.

Figure 4:
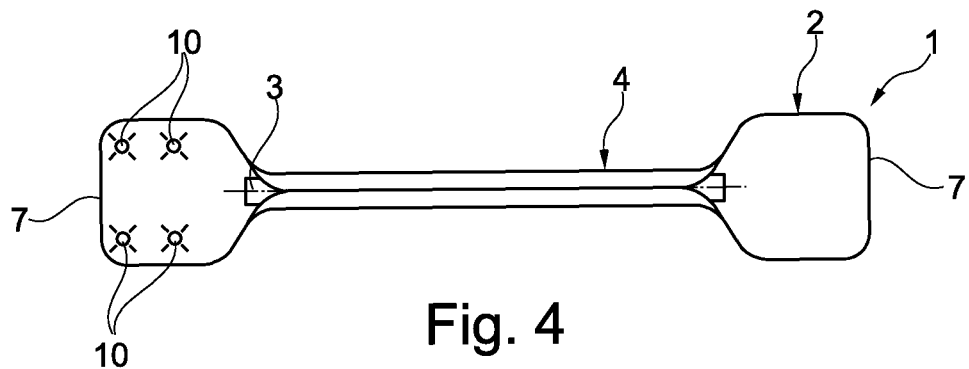
FIG. 4 is a bottom view of the embodiment of the securing element according to FIG. 1 with welding locations indicated.
Figure 7:
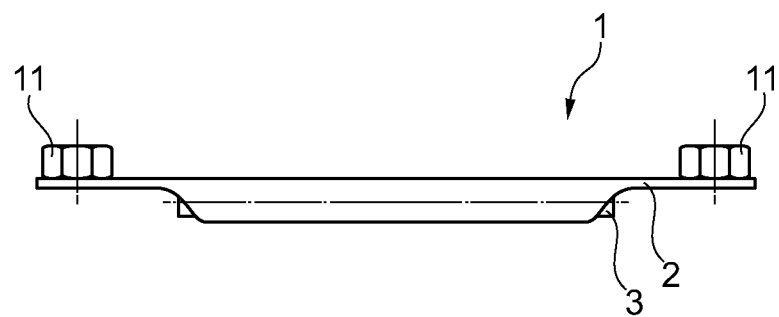
FIG. 7 is a side view of the embodiment of the securing element according to FIG. 1, with a screw connection indicated.
Figure 8A:
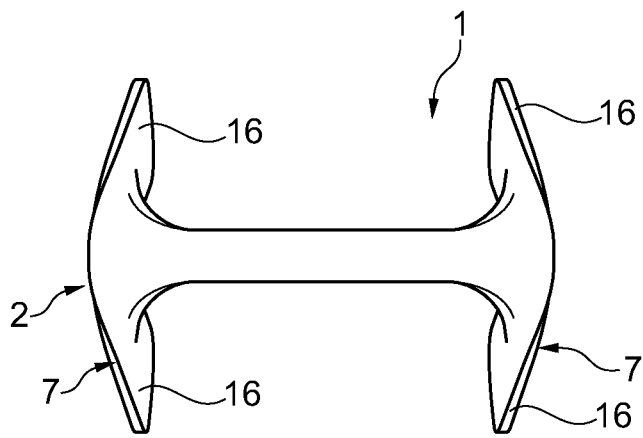
FIGS. 8a to 8d show another embodiment of the element with two-wing end regions, respectively.
Figure 8B:
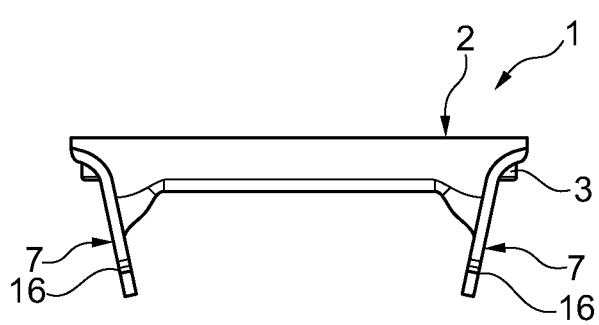
Figure 8D:
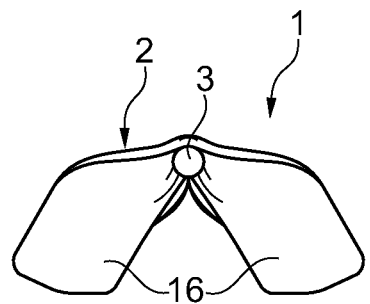
Figure 8C:
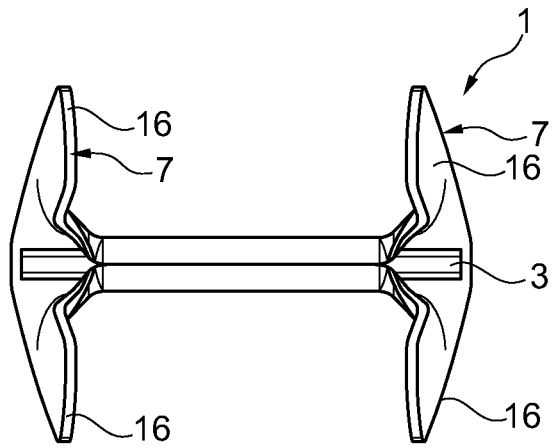

The sheet metal component 2 protrudes in order to secure the securing element 1 to the bodywork component K with the end region 7 at both end sides beyond the reinforcement element 3. These end regions 7 are constructed in the manner of flaps. As indicated in FIG. 4 by way of example at an end region 7 by means of illustrated welding locations 10, the end regions 7 can be secured to the bodywork component K by means of spot welding, in particular resistance spot welding, the use of the resistance spot welding being advantageous in particular if the connection is expected to be subjected to shearing loading. The end regions 7 can also be adhesively bonded and/or screwed to the bodywork component. The latter possibility is shown in FIG. 7 with the illustration of a screw nut 11 in the end region 7, the screw nut 11 already being secured in position at the end region 7 during preassembly.

Figures 1A, 1B:
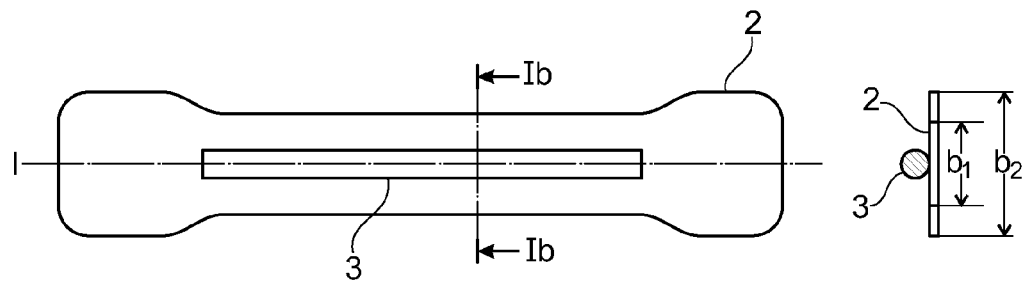
FIGS. 1a and 1b each show a semi-finished product for an embodiment of a securing element prior to production thereof, respectively, FIGS. 2a to 2c each show an embodiment of the securing element produced from the semi-finished product according to FIG. 1 with a sheet metal component and reinforcement element, respectively.

FIGS. 1 and 2 show in a purely schematic manner the assembly of the securing element 1, the sheet metal component 2 shown in FIG. 1 being prefabricated in a state cut to length. The reinforcement element 3, in the embodiments of the securing element 1 illustrated in the drawing, is cut to length from a wire-like round steel. In order to produce the securing element 1, the reinforcement element 3 is rolled into the sheet metal component 2. The sheet metal component 2 thereby becomes mechanically stable in the region of the reinforcement element 3, is constructed in a tubular manner and is in radial abutment at the inner side with the reinforcement element 3.

The sheet metal component 2 has a region 4 in which the reinforcement element 3 is rolled, having a first width b1. The first width b1 is sized in such a manner that, as shown in FIG. 2, the edge sides 5 of the sheet metal component 2 are in blunt abutment with each other with the reinforcement element 3 being surrounded in the peripheral direction.

The flap-like end regions 7 have a second width b2 which is greater than the first width b1, in order thereby to be able to engage in an advantageous manner in terms of mechanical forces with a large face on the abutment face 14 of the bodywork component K. Consequently, the sheet metal component 2 has in this instance in the region 4 a contraction which extends over the entire region. By the reinforcement element 3 being surrounded with the thereby tubular region 4 of the sheet metal component 2, a desired bending location 15 is provided in each case in a transition region from the region 4 to the end regions 7, with regions 7 being at an angle to region 4. The desired bending location 15 is practically arranged at the location at which the tubular shape of the region 4 merges into the start of the planar end region 7 and in that the width is smaller than the second width b2. With the bending or folding of the end regions 7, the necessary deformation consequently takes place at the respective desired bending location 15 and not in the end regions 7 so that the end regions keep their planar surface which may optionally be adapted to the profile of the abutment face.

FIGS. 5 a-e, 6 and 9 a-9 b are various views of various embodiments of a securing system 12 having the securing element 1 and the bodywork member K. By way of example, the bodywork component K, in the embodiments of the securing system 12 shown here, is constructed in the manner of a recess, the securing element 1 bridging the recess 13 of the bodywork component K. It can be seen clearly from the illustrations that the flap-like end regions 7 can be orientated in accordance with a provided abutment face 14 of the bodywork component K by means of bending about a bending axis in such a manner that the end regions 7 can move into planar abutment with the abutment face 14.

Figure 5A:
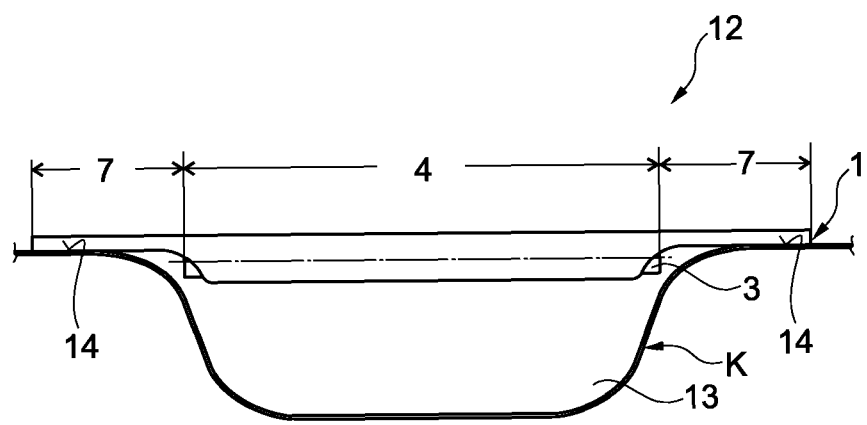
FIGS. 5a to 5e show a securing system with a securing element according to FIG. 4 and a cut-out of a bodywork component in various assembly variants, respectively.
Figure 5B:
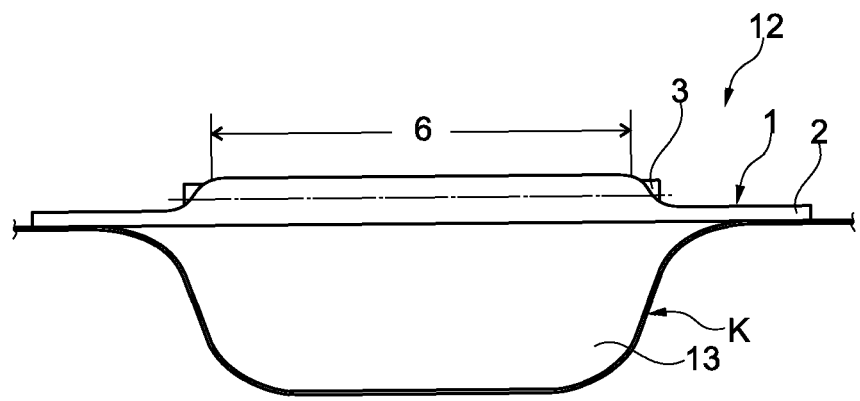

In FIGS. 5a and 5b, the securing element 1 is arranged in extended form in such a manner on the sheet metal component 2 that the securing element 1 bridges the recess 13 and is positioned with the end regions 7 thereof at the edge side of the recess 13. Furthermore, it is made clear in FIGS. 5a and 5b that the securing element 1 can be secured in two positions to the sheet metal component 2 by the reinforcement element 3 being arranged below the sheet metal component 2 in a first position according to FIG. 5a and protruding into the recess 13. In a second position according to FIG. 5b, the reinforcement element 3 is arranged above the sheet metal component 2. With regard to the positional stability of the edge sides 5, the first position according to FIG. 5a is particularly advantageous when the securing element 1 is loaded in terms of tension perpendicularly out of the recess 13. The arrangement of the reinforcement element 3 according to FIG. 5b above the sheet metal component is particularly advantageous when the securing element 1 is loaded primarily in terms of pressure, that is to say, is loaded with a pressure force in the direction into the recess 13. In both cases, the edge sides 5, in the event of resilient loading of the securing element 1, are pressed against each other over the periphery so that an expansion of the sheet metal member 2 at the edge sides 5 can thereby be counteracted.

FIG. 6 shows another embodiment of the securing system 12 having a securing element 1, which has two reinforcement elements 3 which are arranged one behind the other with respect to the longitudinal direction I. In this instance, there is provided between the reinforcement elements 3 a central region 7.1 in which the securing element 1 is additionally supported on the bodywork component K. This is intended to indicate only an additional possibility which provides the basic structure of the securing element 1 by the reinforcement elements 3 and the end regions 7 being arranged relative to each other or combined with each other in accordance with the requirements which the construction of the bodywork component K places on the construction of the securing element 1. For example, a parallel arrangement of reinforcement elements 3 which each open, for example, in a common end region is also conceivable in this instance.

Depending on the load to be anticipated in each case for the securing element 1 which is secured to the bodywork component K, the securing of the end regions 7 can take place with different orientation of the end regions 7 with respect to the bodywork component K. According to FIG. 5c, the end regions 7 are bent so as to protrude into the recess 13 so that the connection between the end region 7 and abutment face 14 of the bodywork component is loaded primarily in terms of shearing with tensile loading of the securing element 1 in a perpendicular direction out of the recess 13.

Figure 5C:
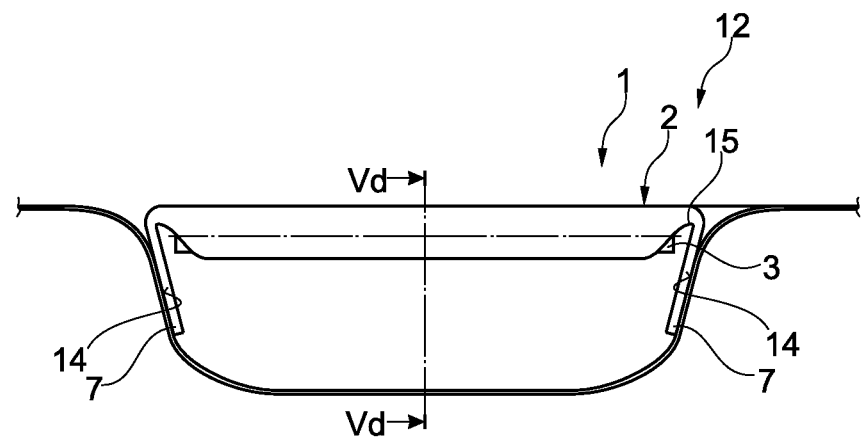
Figure 5D:
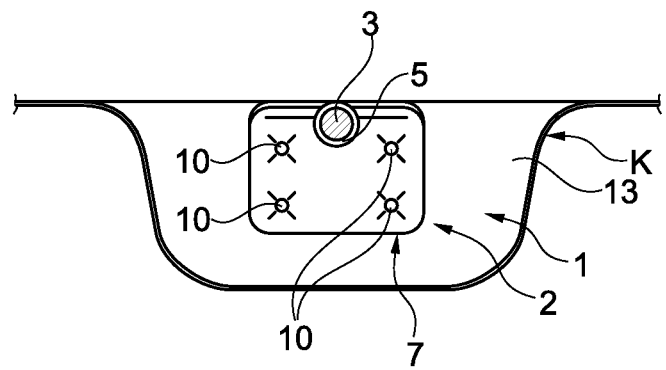
Figure 5E:
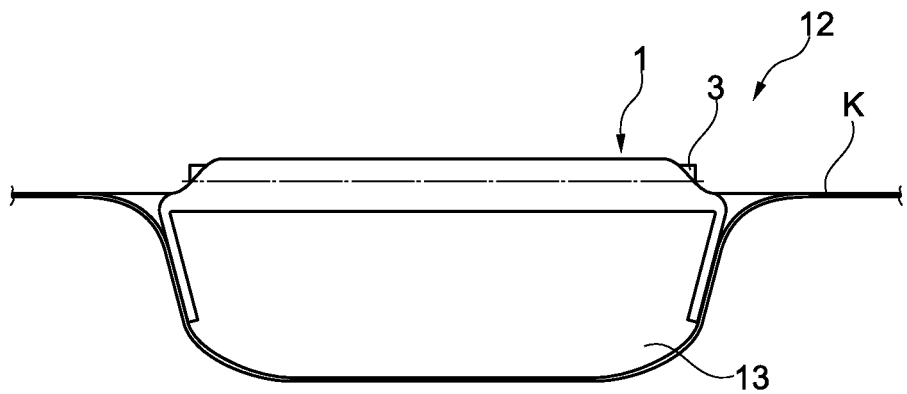

FIG. 5d is a sectioned view according to the line of section Vd-Vd according to FIG. 5c, the end regions 7 being secured to the abutment face 14 in this instance by means of resistance spot welding. According to FIG. 5e, in contrast to the securing system 12 according to 5c, the reinforcement element 6 is arranged at the top with respect to the sheet metal component 2, whereby the edge sides 5 of the sheet metal component 2 are directed upwards. This arrangement is particularly advantageous when the securing element 1 is loaded with a pressure force whose direction is directed into the recess 13 since the edge sides 5 are thereby pressed against each other.

FIGS. 8 and 10 illustrate another embodiment of the securing element 1, the emphasis here being on the construction of the end regions 7. The end regions 7 may generally be adapted to the abutment face in terms of their orientation and planar extent in accordance with the circumstances, that is to say, in particular in accordance with the surface contour and spatial orientation. Accordingly, the end regions 7 in FIGS. 8 and 10 each have a curved contour.

In FIG. 8, for example, the end regions 7 are each constructed with two wings, both wings extending away from the securing element 1 so as to be slightly splayed apart from each other substantially perpendicularly relative to the reinforcement element 3. A mechanically stable support of the securing element 1 on abutment faces 14 is thereby achieved, which faces accordingly extend substantially perpendicularly relative to the reinforcement element 3 in the installation position of the securing element.

Figure 9A:
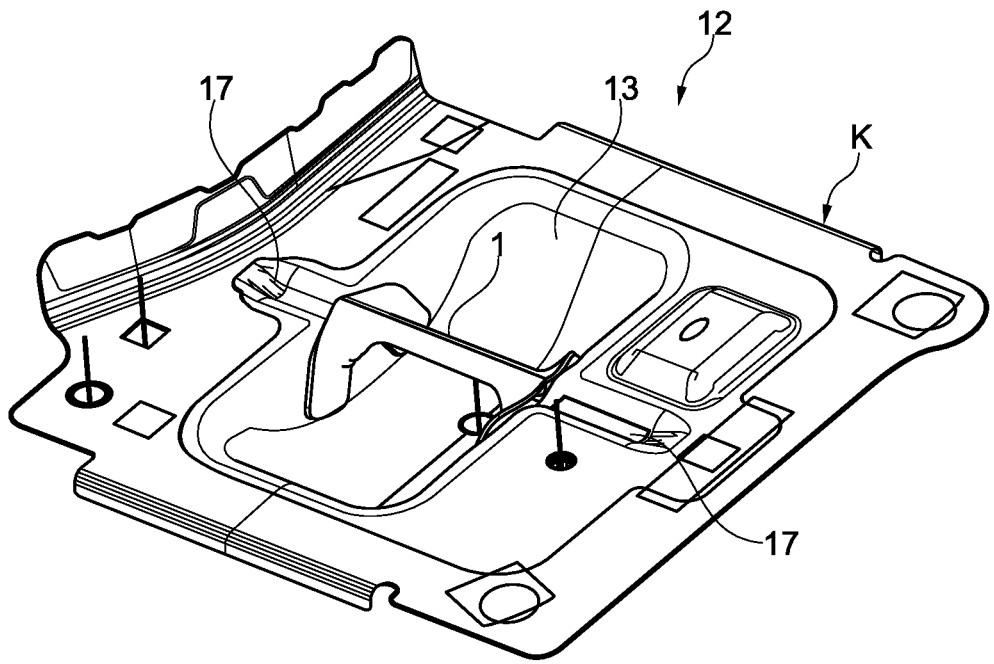
FIGS. 9a and 9b are a plan view of another embodiment of the securing system having the securing element according to FIG. 8, respectively.
Figure 9B:
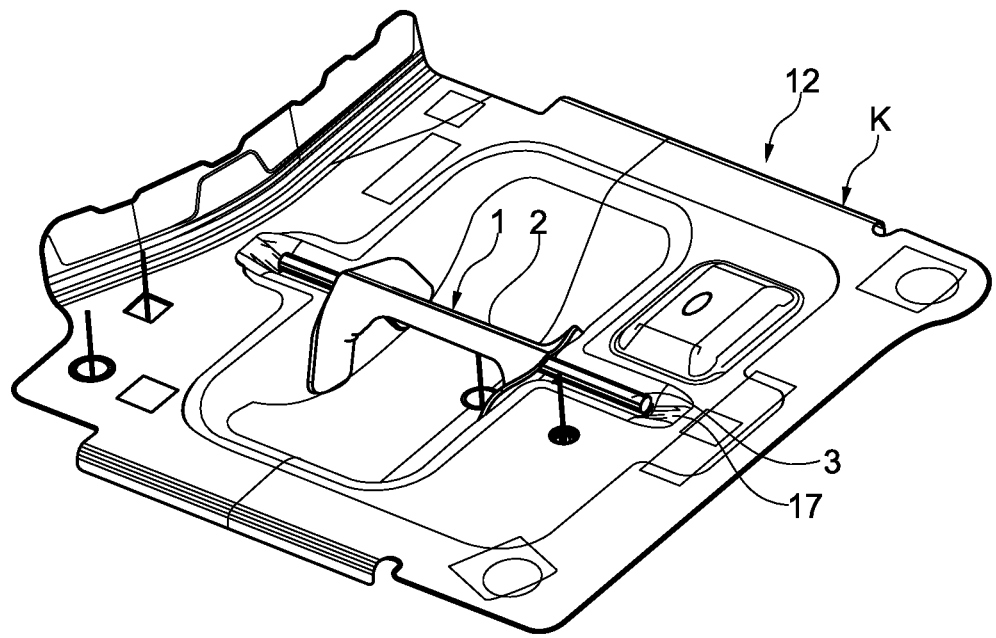
Figure 10A:
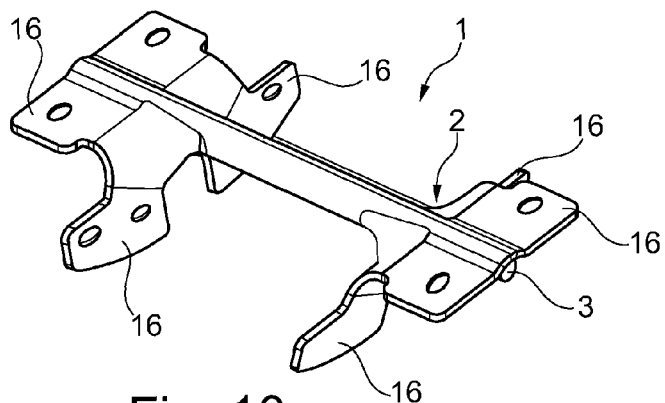
FIGS. 10a to 10d show another embodiment of the securing element with three-wing end regions, respectively.
Figure 10B:
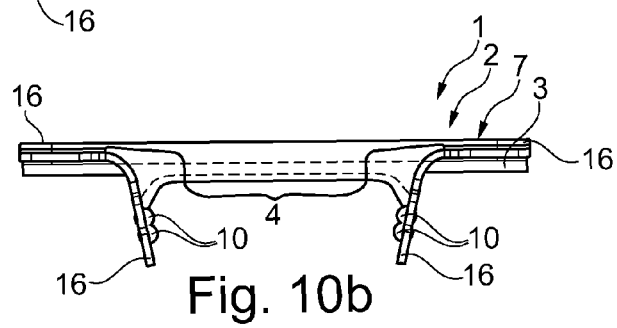
Figure 10C:
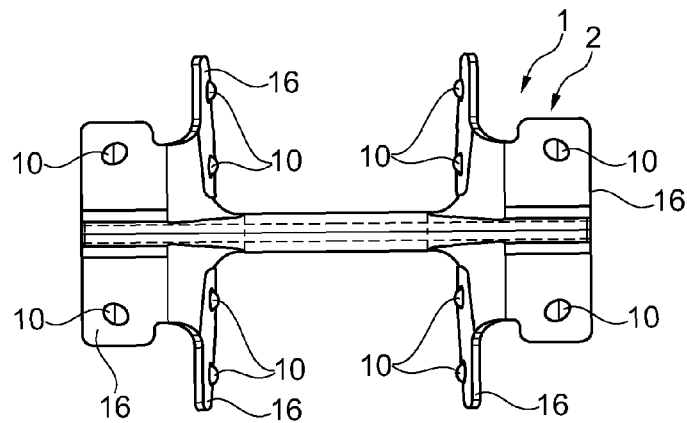
Figure 10D:
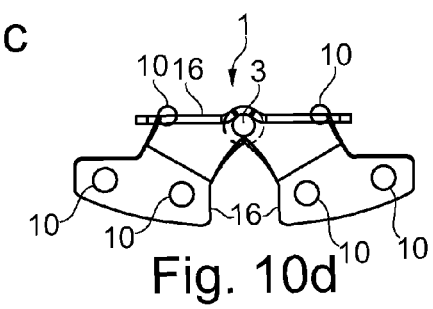

FIGS. 9a and 9b each show a possible installation situation of the securing element 1 with the sheet metal component according to FIG. 8 on the recess 13 of the bodywork component K, the recess 13 being intersected at right angles at the upper side by a groove 17. According to FIG. 8, the reinforcement element 3 does not extend beyond the region 4 of the sheet metal component 2 so that the securing element 1 to which the bodywork component K is secured is supported only via the end regions 7 of the sheet metal component 2 on the bodywork component K by the element engaging at the inner wall side of the recess 13. According to FIG. 9b, however, the reinforcement element 3 extends beyond the region 4 of the sheet metal component 2, the reinforcement element 3 being positioned at both end sides in the groove 17. When the reinforcement element 3 is positioned in the groove 17, an additional support of the securing element 1 on the bodywork component K is provided so that the forces which can be transmitted between the securing element 1 and bodywork component K may accordingly be greater.

According to FIG. 10, in addition to the two wings 16 with an L-shaped profile being formed (FIG. 9a), there is provided an additional wing 16 which extends in the longitudinal direction I and which covers the reinforcement element 3. A combination of the above-described securing possibilities can thereby be achieved by the securing element being positioned with the wing 16 thereof in the direction of the longitudinal direction I laterally on a recess edge of a recess 13 of the bodywork component K and engaging with the two wings 16 thereof substantially perpendicularly relative to the longitudinal direction I in the recess 13 and being secured at the side of the recess 13 at the welding locations 10 which are illustrated here by way of example. In combination with FIGS. 8 and 9a, it can clearly be seen that the reinforcement element may also be constructed in such a shortened manner in this instance that it does not protrude beyond the region 4 of the sheet metal component 2 and, in the assembly position of the securing element 1 on the bodywork component K, is not supported thereon at the upper side.

The invention claimed is:
1. A securing system, comprising:
   a metal bodywork component having a bodywork recess defined in part by abutment faces on opposite ends of the recess;
   a sheet metal component bridging the recess and having a central tubular region extending in a longitudinal direction and having an end region at each end of the central tubular region with each end region bent at an angle to the central tubular region at a bending location, the bending location adapting the end regions to an orientation of the abutment faces and each end region having a width greater than a width of the center tubular region and each end region being disposed at least in part within the recess and in abutment with and fixed to the respective abutment faces, wherein the end regions each include two wings extending outwardly from the center tubular region in opposite directions from each other; and
   a metal elongate reinforcement element being a cylindrical rod extending through an entirety of the central tubular region and the reinforcement element being surrounded and engaged in the central tubular region over a complete periphery of the reinforcement element by the sheet metal component with respect to the longitudinal direction of the reinforcement element.

2. The securing system of claim 1, wherein the wings extend substantially perpendicular relative to the reinforcement element.

3. The securing system of claim 2, wherein the wings have a curved contour.

4. The securing system of claim 2, wherein the reinforcement element extends longitudinally beyond the center tubular region and the end regions each have a third wing integral with the two wings and extending in the longitudinal direction covering the reinforcement element extending beyond the center tubular region and fixed to the bodywork component.

5. The securing system of claim 4, wherein the wings disposed in the recess have a curved contour.

6. The securing system of claim 1, wherein the securing system comprises part of a seat securing system.

7. A securing system for securing an object to a metal bodywork component, the securing system comprising:
the bodywork component including a recess in the bodywork component, the recess having two abutment faces disposed on opposite ends of the recess and the abutment faces defining the recess in part;
a securing element comprising a sheet metal component and a metal structural reinforcement element, the reinforcement element being a cylindrical rod, with the sheet metal component having a longitudinally extending central tubular region surrounding and engaging a complete periphery of the structural reinforcement element, and the reinforcement element extending a full length of the tubular region;
wherein the securing element bridges the recess in the bodywork component and the sheet metal component includes at each end of the central tubular region a protruding end region greater in width than a width of the central tubular region; and
further wherein the end regions each are bent at an angle to the central tubular region at a bending location positioning the end regions substantially parallel with respect to the abutment faces of the bodywork component and the end regions being disposed in the recess and fixed to the abutment faces, wherein the end regions each Include two wings extending outwardly from the central tubular region in opposite directions from each other.

8. The securing system of claim 7, wherein the wings extend substantially perpendicular relative to the reinforcement element.

9. The securing system of claim 8, wherein the wings have a curved contour.

10. The securing system of claim 8, wherein the reinforcement element extends beyond the center tubular region and the end regions each have a third wing integral with the two wings and extending in the longitudinal direction covering the reinforcement element extending beyond the center tubular region and fixed to the bodywork component.

11. The securing system of claim 10, wherein the wings disposed in the recess have a curved contour.

12. The securing system of claim 7, wherein the securing system comprises part of a seat securing system.

\* \* \* \* \*

UNITED STATES PATENT AND TRADEMARK OFFICE
CERTIFICATE OF CORRECTION

| | | |
|---|---|---|
| PATENT NO. | : 9,664,332 B2 | Page 1 of 1 |
| APPLICATION NO. | : 14/450378 | |
| DATED | : May 30, 2017 | |
| INVENTOR(S) | : Herik Martin Huhn | |

It is certified that error appears in the above-identified patent and that said Letters Patent is hereby corrected as shown below:

In the Claims

Column 10, in Line 14, replace "Include" with -- include --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*